(12) United States Patent
Julian et al.

(10) Patent No.: US 7,604,422 B2
(45) Date of Patent: Oct. 20, 2009

(54) LARGE-APERTURE FOCAL PLANE SHUTTER

(75) Inventors: Brian John Julian, Burlington, MA (US); Anthony Mark Smith, Medway, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 347 days.

(21) Appl. No.: 11/608,915

(22) Filed: Dec. 11, 2006

(65) Prior Publication Data

US 2008/0138059 A1    Jun. 12, 2008

(51) Int. Cl.
    *G03B 9/40* (2006.01)
(52) U.S. Cl. .................... 396/484; 396/487; 396/489
(58) Field of Classification Search .......... 396/479–489
    See application file for complete search history.

(56) References Cited

U.S. PATENT DOCUMENTS

| | | | |
|---|---|---|---|
| 2,975,689 A | | 3/1961 | Chatani |
| 3,672,282 A | * | 6/1972 | Yamada ................... 396/456 |
| 3,871,012 A | | 3/1975 | Haraguchi |
| 3,886,572 A | | 5/1975 | Onda et al. |
| 4,051,499 A | * | 9/1977 | Kondo ....................... 396/464 |
| 4,054,892 A | | 10/1977 | Nakagawa et al. |
| 4,268,147 A | | 5/1981 | Date et al. |
| 5,012,263 A | * | 4/1991 | Tull et al. ................... 396/479 |
| 5,475,459 A | | 12/1995 | Matsubara et al. |
| 5,614,978 A | | 3/1997 | Kanzaki |
| 5,663,624 A | * | 9/1997 | Callaway .................... 318/696 |
| 5,822,629 A | | 10/1998 | O'Brien |
| 6,106,165 A | | 8/2000 | Tanabe |
| 6,874,515 B2 | | 4/2005 | Ishihara et al. |
| 2002/0197078 A1 | * | 12/2002 | Toyoda ....................... 396/484 |

OTHER PUBLICATIONS

Simultaneous Multichannel Photometry with BUSCA, Oliver-Mark Cordes, Sep. 13, 2004, relevant portions. Entire document avalible from The University of Bonn online electronic publication of dissertations at http://hss.ulb.uni-bonn.de/diss_online/.*
International Search Report for PCT/US2007/084924 dated Sep. 29, 2008; 2 pages.

* cited by examiner

Primary Examiner—Melissa J Koval
Assistant Examiner—Leon W Rhodes
(74) Attorney, Agent, or Firm—Guerin & Rodriguez, LLP

(57) ABSTRACT

Described is a compact focal plane shutter system adapted for large-format exposure shutters. The focal plane shutter includes at least one multi-segmented screen having multiple rigid blades. Each blade can be moved at a different velocity. By using multiple blades, the rotational inertia about a drive axis can be reduced compared to a conventional single screen shutter system, thus a greater acceleration can be achieved with the same amount of torque about the drive axis. Using smaller blades allows for greater acceleration, resulting in faster shutter speeds to support a wider range of applications. Additionally, the overlap between blades of a multi-segmented screen in an open position is greater than the overlap of the blades in a closed position, providing a compact system. A drive mechanism linearly translates the blades of the multi-segmented screen between the open and closed positions.

12 Claims, 9 Drawing Sheets

LARGE-APERTURE FOCAL PLANE SHUTTER

GOVERNMENT RIGHTS IN THE INVENTION

This invention was made with United States government support under Contract No. FA8721-05-C-0002 awarded by the Defense Advanced Research Projects Agency (DARPA). The Government may have certain rights in the invention.

FIELD OF THE INVENTION

The present invention relates generally to focal plane shutters and, more particularly, to a large-aperture focal plane shutter adapted for high-speed operation.

BACKGROUND OF THE INVENTION

A shutter mechanism allows light to pass for a determined period of time. As such, shutters can be used to expose photographic film or a light-sensitive electronic sensor to a preferred amount of light to create an image of a view. A shutter can also be used to allow pulses of light to pass outwards, as in a movie projector or signal lamp. Thus, the shutter is positioned to selectively interfere with a beam of light. In an optical system, the shutter can be mounted behind a lens (central shutters), or near the focal plane (focal plane shutters). The focal plane shutter is a fairly simple mechanism, capable of rapid and accurate shutter speeds.

FIG. 1 depicts a front view of a conventional focal plane shutter 10 for selectively covering and exposing a frame aperture 16 through which a large format exposure is made. Focal plane shutters 10 are usually implemented as a pair of cloth, metal, or plastic curtains that shield film from light. For example, the shutter 10 includes two screens 12, 14 positioned in a plane parallel to the frame aperture 16. The screens 12, 14 are slideable between open and closed positions. In the closed position, one or more of the screens 12, 14 are positioned to substantially cover the frame aperture 16. In the open position, one ore more screens 12, 14 are repositioned to leave at least a portion of the frame aperture 16 uncovered. Exposure times vary from several seconds to a small fraction of a second, depending upon the particular application. In order to support short exposures, the screens 12, 14 can be rapidly and or simultaneously moved between the open and closed positions. One example of such a shutter is a "Bonn shutter" described below.

Large-format exposures are associated with photographic films, view cameras, and processes that use a film or digital sensor having dimensions of 4×5 inches or more. The most common formats are 4×5 and 8×10 inches. Large format exposures are often used in landscape photography, advertising photos of high value consumer items, fine-art photography, images that will be enlarged to a high magnification, and scientific applications demanding very high quality reproductions. One particular application includes producing high-quality astronomical images using optical telescopes. Current techniques capture an image using an electronic detector, such as a charge-coupled device (CCD).

In some applications, the screens 12, 14 used for large format exposures are provided as curtains that roll on and off of respective spools located to the side of the frame aperture 16. A curtain screen may be ineffective in providing a precise exposure due to sagging of the curtain across the large aperture. Others have addressed this problem using rigid screens such as those used with the Bonn shutter developed at the Astronomical Institutes of the University of Bonn. The Bonn shutter, developed for a scalable large format exposure shutter for CCD mosaic cameras, includes a slit-type shutter with a rectangular aperture. The shutter includes two carbon fiber blades moving on a pair of linear ball bearings.

Although the Bonn shutter provides at least one solution to large format exposure shutters, there are limitations. First, the rigid blades are relatively massive thereby complicating rapid accelerations due to their inertia. Second, the rigid blades require substantial clearance along either side of the aperture 16 to accommodate the blade in an open position. As shown in FIG. 1, the minimum width required for a Bonn shutter is $W_{S1}$, which at a minimum includes the width of the aperture $W_A$ combined with the widths of each of the blades 12, 14.

SUMMARY OF THE INVENTION

The present invention provides a compact focal plane shutter system adapted for large-format exposure shutters.

In one aspect, the invention features a focal plane shutter system. The shutter system includes a multi-segmented screen having multiple overlapping blades. The blades are moveable between open and closed positions to expose an aperture in the open position and to block the aperture in the closed position. The shutter system also includes a drive mechanism in communication with the multi-segmented screen. The drive mechanism linearly moves the multi-segmented screen between the open and closed positions with each blade moving at a different velocity than the other blades.

In another aspect, the invention features a method for exposing an aperture using a focal plane shutter. A frame aperture is covered with a screen having a plurality of overlapping blades. The blades are disposed between impinging light and the frame aperture to prevent the impinging light from reaching the covered frame aperture. At least two of the overlapping blades slide in a common linear direction at different velocities to expose at least a portion of the frame aperture to the impinging light.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview, the present invention relates to a compact focal plane shutter system adapted for large-format exposure shutters. The focal plane shutter includes at least one screen having multiple blades, referred to herein as a multi-segment screen. As used herein, the term "screen" generally means an assembly that includes one or more components (e.g., blades) that are opaque to electromagnetic radiation. The term "light" as used herein includes visible, infrared and ultraviolet light, and other types of electromagnetic radiation (e.g., x-ray radiation) that can be sensed or detected by devices disposed in or near the focal plane. Each blade of the multi-segment screen can be moved at a different velocity. By using multiple blades, the rotational inertia about a drive axis can be reduced compared to a conventional single screen shutter system, thus a greater acceleration can be achieved with the same amount of torque about the drive axis. Using smaller blades allows for greater acceleration, resulting in faster shutter speeds to support a wider range of applications. Unlike conventional large-format exposure shutters employing a flexible screen or a single rigid blade, the shutter of the present invention uses multiple rigid blades. Because the screen is rigid, sagging across the frame aperture is eliminated.

Figure 2:
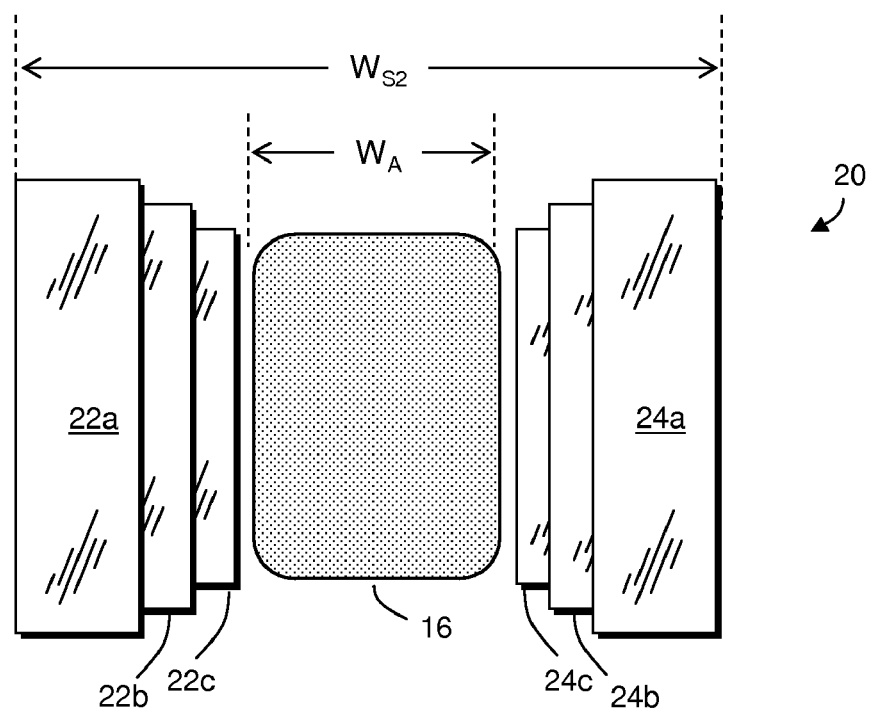
FIG. 2 depicts a front view of one embodiment of a dual-screen focal plane shutter constructed in accordance with the present invention.

FIG. 2 depicts a front view of one embodiment of a dual-screen focal plane shutter 20 adapted for large-format exposures. The shutter 20 includes two multi-segmented screens 22, 24 each disposed above a frame aperture 16. Each of the multi-segmented screens 22, 24 includes a top blade 22a, 24a, an intermediary blade 22b, 24b, and a bottom blade 22c, 24c. Each of the multi-segmented screens 22, 24 is independently translatable between closed and open positions. In a closed position, each of the multi-segmented screens 22, 24 independently covers the entire frame aperture 16.

Figure 1:
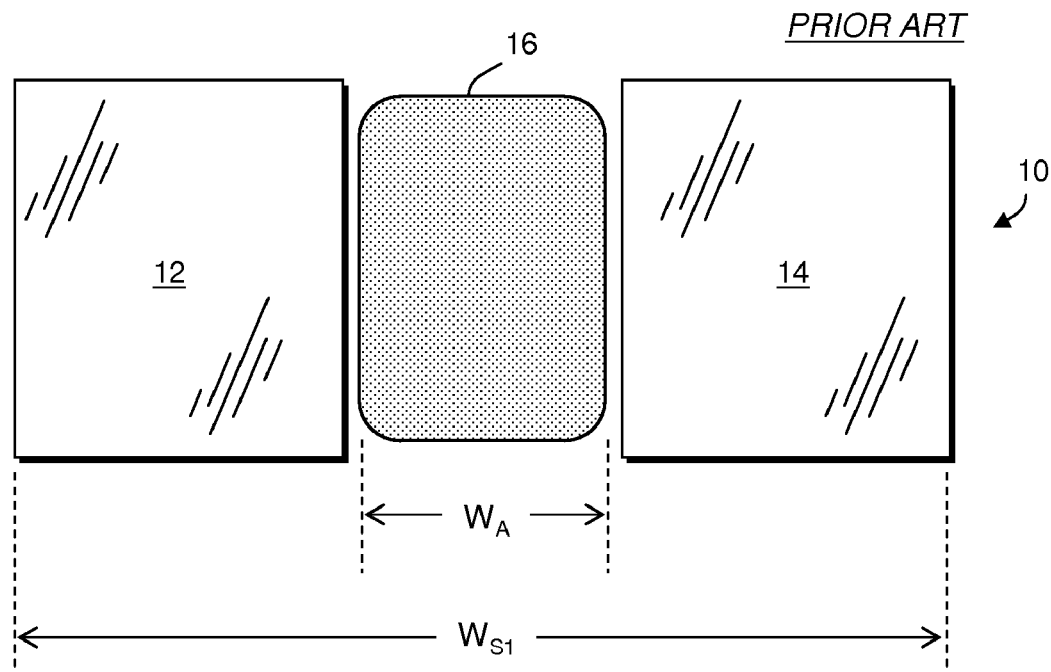
FIG. 1 depicts a front view of a conventional focal plane shutter.

The dual-screen focal plane shutter 20 is illustrated with each of the multi-segmented screens 22, 24 shown in the open position. Such a configuration completely uncovers the frame aperture 16 allowing for exposure of the entire frame aperture 16. Preferably, at least some of the blades 22a, 22b, 22c of the left screen 22 in the open position overlap each other. Similarly, at least some of the blades 24a, 24b, 24c of the right screen 24 in the open position overlap each other. By overlapping, the maximum dimension necessary to accommodate the dual-screen focal plane shutter 20 with both screens 22, 24 in the open position $W_{S2}$ is substantially less than the maximum dimension $W_{S1}$ of the prior art shutter having single-blade screens 12, 14 (FIG. 1). Such a dimensional reduction is advantageous in applications in which space is limited. Moreover, as each of the blades 22a, 22b, 22c, 24a, 24b, 24c is independently moveable, more rapid accelerations are possible under the same driving force as the inertia of each blade 22a, 22b, 22c, 24a, 24b, 24c is less than the inertia of a single-blade screen 12, 14 (FIG. 1) sized for the same frame aperture 16.

Figure 3:
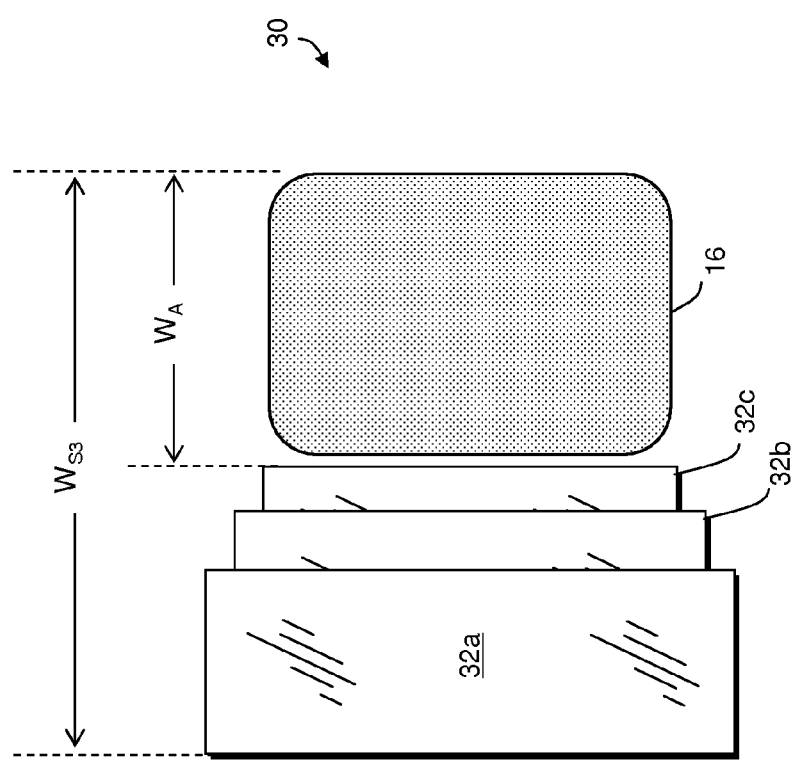
FIG. 3 depicts a front view of another embodiment of a single screen focal plane shutter constructed in accordance with the present invention.

FIG. 3 depicts a front view of an alternative embodiment of a single-screen focal plane shutter 30 consisting of a single multi-segmented screen 32, including three blades 32a, 32b, 32c. The single multi-segmented screen 32 is substantially equivalent to one of the screens 22, 24 of the dual screen shutter 20 (FIG. 2). Although the maximum dimension $W_{S3}$ of the single-screen focal plane shutter 30 is even less than that of the dual-screen shutter 20 (FIG. 2), its applicability is limited as it does not support uniform exposure of the frame aperture 16. As the exposure cycle includes the single screen 32 opening and closing, some portions of the frame aperture 16 will be exposed more than other portions.

Figure 4A:
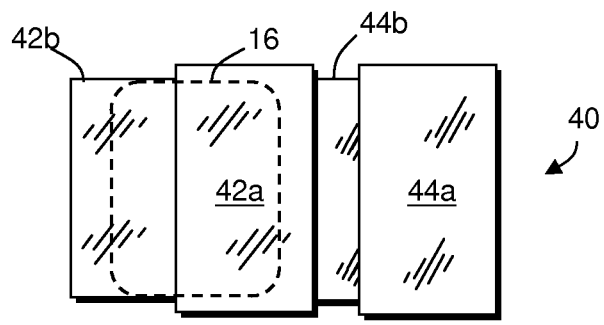
FIG. 4A through FIG. 4E depict front views of a dual-screen focal plane shutter constructed in accordance with the present invention illustrating the positions of the screens during different instances of an exposure cycle.

FIG. 4A through FIG. 4E depict a front view of a dual-screen focal plane shutter 40 constructed in accordance with the present invention and illustrating the positions of the screens during different instances of an exposure cycle. FIG. 4A depicts dual-screen focal plane shutter 40 in a closed configuration (i.e., pre-exposure position) in which the frame aperture 16 is covered by one of the screens 42. In particular, a top blade 42a and a bottom blade 42b of the left screen 42 together block the frame aperture 16. The bottom blade 42b covers a left portion of the frame aperture 16 and the top blade 42a covers a right portion of the frame aperture 16. Generally, there remains a partial overlap of the top and bottom blades 42a, 42b in the pre-exposure configuration to ensure coverage of the frame aperture 16. To ensure complete coverage of the frame aperture 16, the left screen 42 also extends beyond the edges of the frame aperture 16 in one or more dimensions. The right screen 44 also includes a top blade 44a and a bottom blade 44b. In the pre-exposure configuration, the right screen 44 remains in an open position, with the entire screen 44 disposed along one side of the frame aperture 16.

Figure 4B:
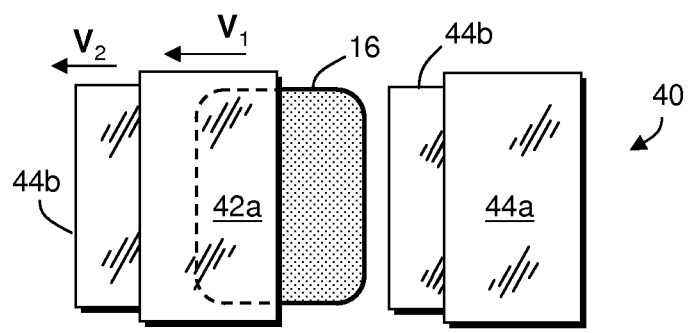

FIG. 4B depicts the dual-screen focal plane shutter 40 in transition between pre-exposure and full-exposure configurations. The left screen 42 is in transition between its closed and open positions, leaving a portion of the frame aperture 16 uncovered. The right screen 44 remains in its open position. During transition of the left screen 42 from its closed to open positions, the top blade 42a travels at a velocity $V_1$ and the bottom blade 42b travels at a slower velocity $V_2$. Thus, if both blades 42a, 42b are moved for the same duration, the top blade 42a will travel a greater distance than the bottom blade 42b. This results in an increasing overlap of the two blades 42a, 42b in transition to the open position.

Figure 4C:
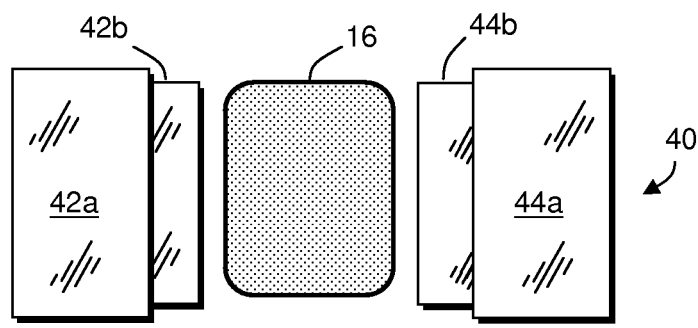

FIG. 4C depicts the dual-screen focal plane shutter 40 in a full-exposure configuration. The left screen 42 is now in an open position, with both blades 42a, 42b disposed along a left side of the frame aperture 16, while the right screen 44 remains in its open position. In this configuration, the frame aperture 16 is completely uncovered by either of the screens 42, 44.

Figure 4D:
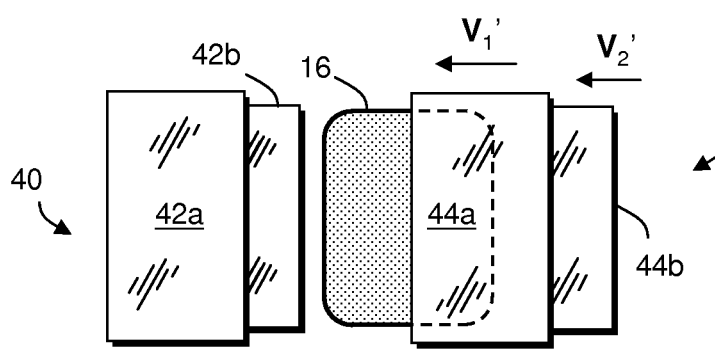

FIG. 4D depicts the dual-screen focal plane shutter 40 in transition between the full-exposure configuration and a post-exposure configuration. The right screen 44 is in transition between its open and closed positions, with the right screen 44 overlapping a portion of the frame aperture 16. Any portion of the frame aperture 16 not covered by the right screen 44 remains exposed to light impinging from the opposite side of the screen 44. During transition, the top blade 44a travels at a first velocity $V_1'$ and the bottom blade 44b travels at a slower velocity $V_2'$. The left screen 42 remains in its open position, with the entire screen 42 disposed along the left side of the frame aperture 16.

Figure 4E:
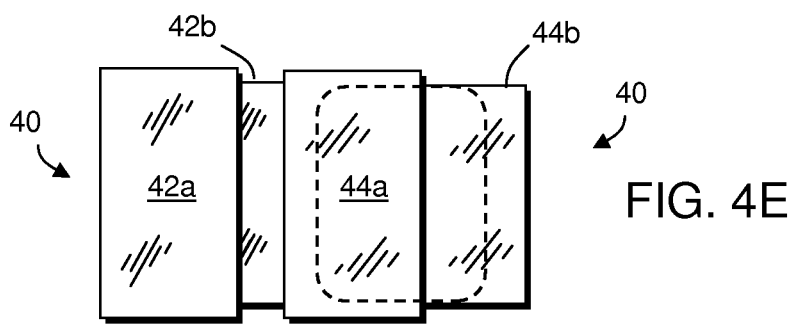

FIG. 4E depicts the dual-screen focal plane shutter 40 in a post-exposure configuration. The right screen 44 is in a closed position, covering the entire frame aperture 16 while the left screen 42 remains in an open position, in which the entire screen 42 is disposed along one side of the frame aperture 16. In this configuration, the top blade 44a covers a left portion of the frame aperture 16; whereas, the bottom blade 44b covers a right portion of the frame aperture 16. In some embodiments, the top blade 44a overlaps a portion of the bottom blade 44b. From this configuration, the entire exposure cycle can be repeated, but in an opposite sense with both screens 42, 44 moving from left to right.

For exposures of, typically, 1/30th of a second or more, the initially closed screen 42 opens fully before the initially open screen 44 begins to close. For shorter exposures, the initially open 44 screen begins to close before the initially closed screen 42 is fully open. Thus, for at least some period within an exposure cycle, the two screens 42, 44 move simultaneously leaving a slit-shaped opening through which light can pass. The speed of motion of the screens 42, 44 and the width of the slit are adjustable so that each part of the frame aperture 16 is exposed to light for a predetermined length of time (the effective exposure time). Beneficially, the dual-screen shutters 40 can support uniform exposure of the aperture, such that any region of the frame aperture 16 (e.g., a pixel) is exposed for the same duration as any other region of the frame aperture 16.

Figure 5A:
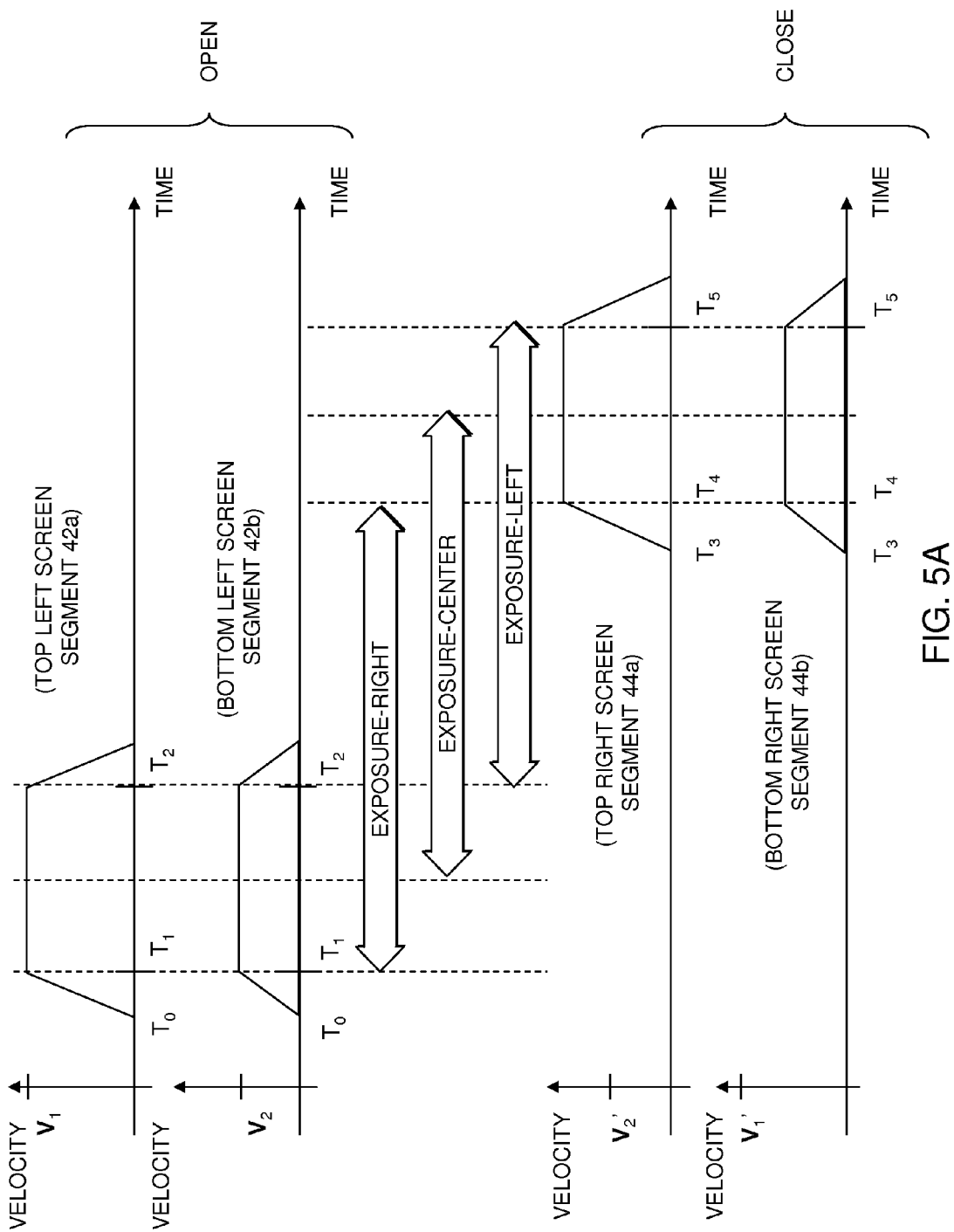
FIG. 5A is a graphical representation of the differing velocity of each blade of the dual-screen shutter of FIG. 2 as a function of time for a long exposure cycle.

FIG. 5A graphically depicts the different velocities as a function of time for each of the blades 42a, 42b, 44a, 44b during a long exposure cycle. Prior to time $T_0$, all blades 42a, 42b, 44a, 44b are at rest. The top two graphs represent the velocity profiles of the left blades 42a, 42b through a single exposure cycle. Between time $T_0$ and time $T_1$, each of the blades 42a, 42b of the left screen 42 accelerates from a rest position to a respective velocity $V_1$, $V_2$. Between times $T_1$ and $T_2$, each of the left blades 42a, 42b continues to travel at a substantially constant velocity. After time $T_2$, each of the left blades 42a, 42b decelerates to a rest position. The acceleration and deceleration periods can be referred to as wind-up and wind-down periods, respectively.

The bottom two graphs represent the velocity profiles of the right blades 44a, 44b through the same exposure cycle. Between time $T_3$ and time $T_4$, each of the right blades 44a, 44b accelerates from a rest position to a respective velocity $V_1'$, $V_2'$. Between times $T_4$ and $T_5$, each of the right blades 44a, 44b continues to travel at its respective velocity $V_1'$, $V_2'$. After time $T_5$, each of the right blades 44a, 44b decelerates to a rest position. In some embodiments, no portion of the frame aperture 16 (FIG. 4A) is exposed during the acceleration of the left blades 42a, 42b between times $T_0$ and $T_2$. Likewise, no portion of the frame aperture is exposed during the deceleration of the right blades 44a, 44b after $T_5$. This can be accomplished by providing a travel distance that is greater than the frame aperture dimension spanned by the travel.

The exposure interval can be defined according to a point in the frame aperture 16. For example, a right-exposure is defined with respect to a point along the right edge of the frame aperture 16 between times $T_1$ and $T_4$. A left-exposure is defined for a point along the left edge of the frame aperture 16 between times $T_2$ and $T_5$. A center-exposure is defined for a point in the middle of the frame aperture 16 between times $(T_2-T_1)/2$ and $(T_5-T_4)/2$. The term long-exposure indicates that the exposure interval includes a period during which neither the left screen 42 nor right screen 44 cover the frame aperture 16.

The exemplary velocity profiles are generally trapezoidal in shape. A trapezoidal velocity profile includes an initial positive sloping period of substantially linear acceleration. This is followed by an extended period of substantially constant velocity, followed by a final negative sloping period of substantially linear deceleration. Other velocity profiles are possible, such as a sine-squared profile, during which the velocity versus time follows a sine-squared function. More generally, an arbitrary velocity profile is possible which supports a substantially uniform exposure as long as the same velocity profile is repeated by each of the screen pairs.

Figure 5B:
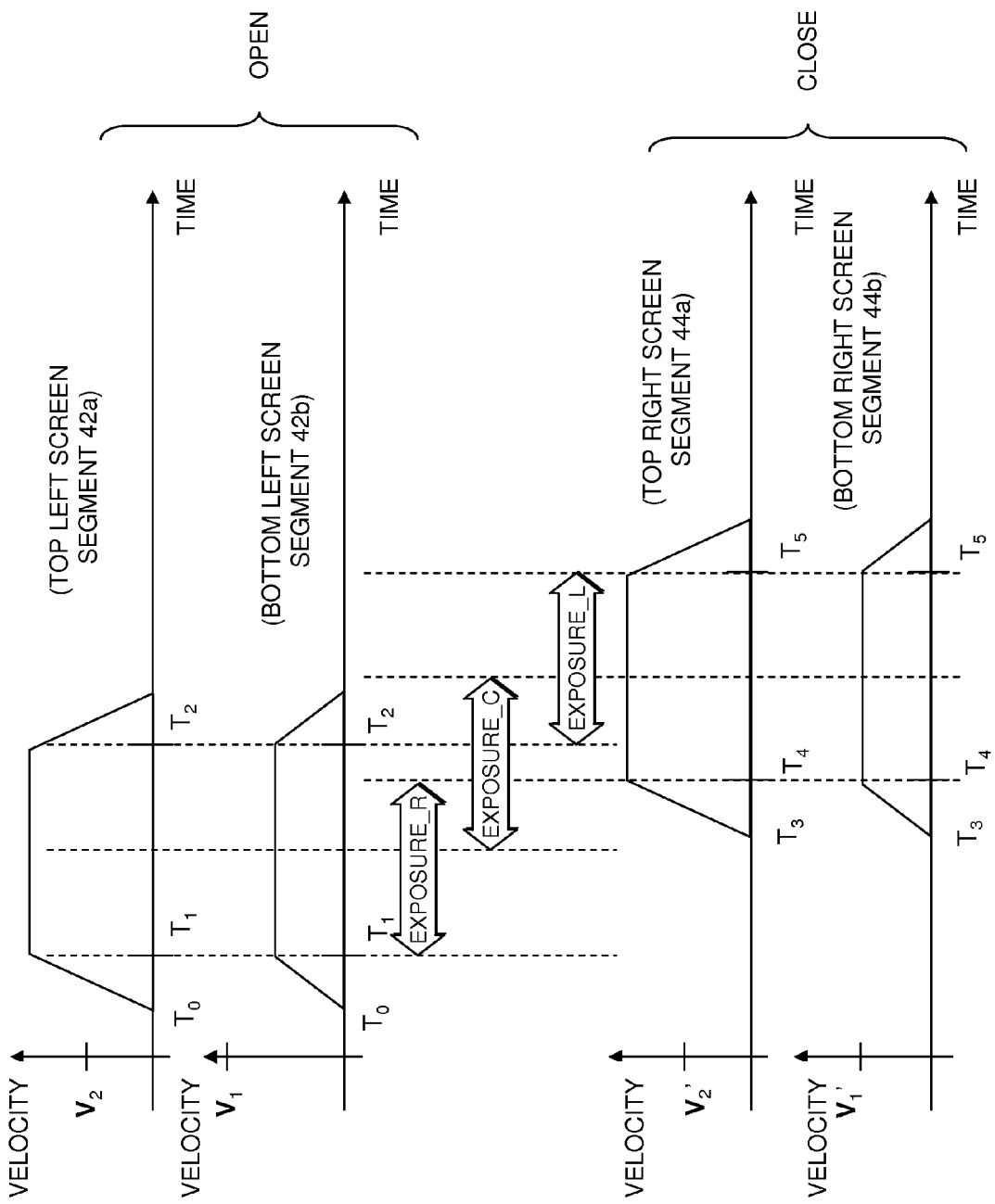
FIG. 5B is a graphical representation of the differing velocity of each blade of the dual-screen shutter of FIG. 2 as a function of time for a short exposure cycle.

FIG. 5B graphically depicts the velocities as a function of time of each of the blades 42a, 42b, 44a, 44b during a short exposure cycle. The velocity profiles for the left blades 42a, 42b during the short exposure cycle are substantially identical to those depicted in FIG. 5A for the long exposure cycle. The difference is that the time $T_4$ at which the right screen 44 begins to cover the exposed frame aperture 16 occurs before time $T_2$ at which the left screen 42 has fully traversed the frame aperture 16. As a result, the closing screen 44 follows the opening screen 42 leaving a slit therebetween. This width of the slit as well as the velocity of the top screen segments determines the short exposure interval.

Figure 6:
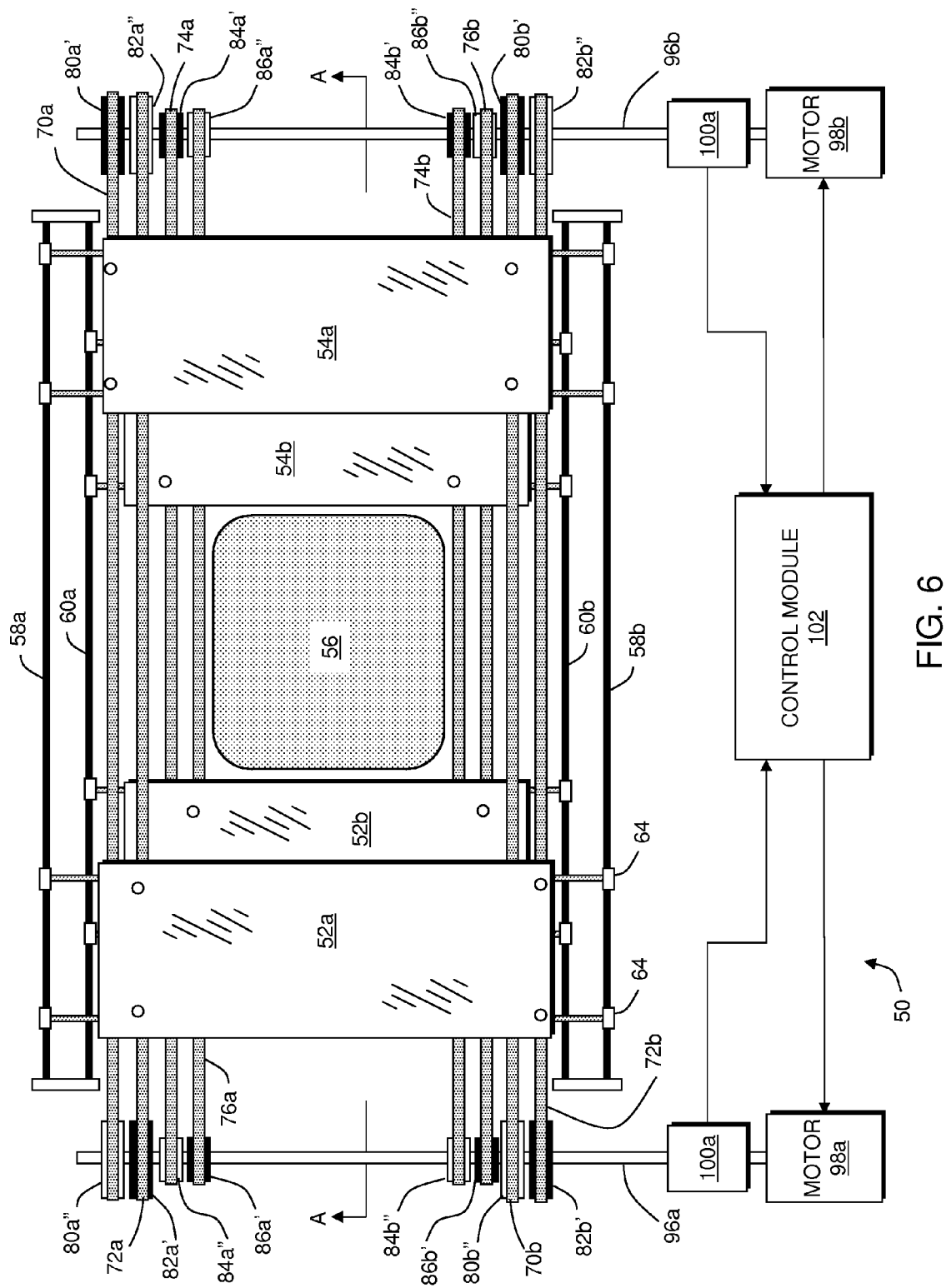
FIG. 6 is a detailed illustration of an embodiment of a dual-screen focal plane shutter with a belt-and-pulley drive mechanism and constructed in accordance with the present invention.

FIG. 6 is a more detailed diagram of an embodiment of a dual-screen focal plane shutter 50 constructed in accordance with the present invention utilizing a belt-and-pulley drive mechanism. The dual-screen shutter 50 includes a left multi-segmented screen 52 having a top blade 52a and a bottom blade 52b and a right multi-segmented screen 54 having a top blade 54a and a bottom blade 54b. Each of the blades 52a, 52b, 54a, 54b is coupled to a respective pair of drive belts. More particularly, the top right blade 54a is coupled to a first top pair of belts 70a, 70b (generally 70); the bottom right blade 54b is coupled to a first bottom pair of belts 74a, 74b (generally 74); the top left blade 52a is coupled to a second top pair of belts 72a, 72b (generally 72); and the bottom left blade 52b is coupled to a second bottom pair of belts 76a, 76b (generally 76).

Each belt 70, 72, 74, 76 is formed in an elongated continuous loop disposed about a respective pair of end pulleys. One of the end pulleys is a drive pulley used to rotate the belt and the opposite end pulley is an idler pulley used to maintain the belt position and tension. Of the first top pair of belts 70, the first belt 70a rotates about a left idler pulley 80a" and a right drive pulley 80a' and the second belt 70b rotates about a left idler pulley 84b" and a right drive pulley 84b'. Of the first bottom pair of belts 74, the first belt 74a rotates about a left idler pulley 84a" and a right drive pulley 84a' and the second belt 74b rotates about a left idler pulley 84b" and a right drive pulley 84b'. Of the second top pair of belts 72, the first belt 72a rotates about a left drive pulley 82a' and a right idler pulley 82a" and the second belt 72b rotates about a left drive pulley 82b' and a right idler pulley 82b". Of the second bottom pair of belts 76, the first belt 76a rotates about a left drive pulley 86a' and a right idler pulley 86a" and the second belt 76b rotates about a left drive pulley 86b' and a right idler pulley 86b".

In the exemplary embodiment, all of the left pulleys 80a", 80b", 82a', 82b', 84a", 84b", 86a', 86b' rotate about a common left axle 96a. Each of the left drive pulleys 82a', 82b', 86a', 86b' is fixedly coupled to the left axle 96a; whereas the left idler pulleys 80a", 80b", 84a", 84b" are allowed to freely rotate. Thus, rotation of the left axle 96a at an angular velocity produces an equivalent rotation of the each of the drive pulleys coupled thereto at the same angular velocity. Similarly, all of the right pulleys 80a', 80b', 82a", 82b", 84a', 84b', 86a", 86b" rotate about a common right axle 96b. Each of the right drive pulleys 80a', 80b', 84a', 84b' is fixedly coupled to the right axle 96b; whereas the right idler pulleys 82a", 82b", 86a", 86b" are allowed to freely rotate. Rotation of the right axle 96b at an angular velocity produces an equivalent rotation of the each of the drive pulleys coupled thereto at the same angular velocity.

The left axle 96a is coupled to a left motor 98a and the right axle 96b is coupled to a right motor 98b. Each motor 98a, 98b independently and selectively drives the axle 96a, 96b coupled thereto, causing the axle 96a, 96b to rotate at a respective angular velocity. For example, rotation of the left axle 96a causes the left drive pulleys 82a', 82b', 86a', 86b' to rotate at a common angular velocity. Each of the left driven pulleys 82a', 82b', 86a', 86b', in turn, causes its respective belt 72a, 72b, 76a, 76b to rotate between its respective end pulley. Rotation of each of the belts 72a, 72b, 76a, 76b causes a respective right idler pulley 82a", 82b", 86a", 86b" to rotate freely about the right axle 96b.

Rotation of the second top pair of belts 72a, 72b as described above linearly translates the left top blade 52a along the elongated portion of the belts 72a, 72b. The velocity of the left top blade 52a is controlled at least in part by the diameter, or pitch, of the respective drive pulleys 82a', 82b'. Rotation of the second bottom pair of belts 76a, 76b linearly translates the left bottom blade 52b along the elongated portion of the belts 76a, 76b, with the velocity of the left bottom blade 52b being controlled at least in part by the pitch of the respective drive pulleys 86a', 86b'.

Rotation of the right axle 96b causes the right drive pulleys 80a', 80b', 84a', 84b' to rotate at the same angular velocity. Each of the right driven pulleys 80a', 80b', 84a', 84b, in turn, causes its respective belt 70a, 70b, 74a, 74b to rotate between its end pulleys. Rotation of each of the belts 70a, 70b, 74a, 74b causes each respective right idler pulley 80a", 80b", 84a", 84b" to rotate freely about the left axle 96a. Rotation of the first top pair of belts 70a, 70b linearly translates or slides the right top blade 54a along the elongated portion of the belts 70a, 70b. The velocity of the right top blade 54a is controlled at least in part by the diameter of the respective drive pulleys 80a', 80b'. Rotation of the first bottom pair of belts 74a, 74b linearly translates the right bottom blade 54b along the elongated portion of the belts 74a, 74b, with the velocity of the right bottom blade 54b being controlled at least in part by the diameter of the respective drive pulleys 84a', 84b'.

In some embodiments, end pulleys for the first and second top pair of belts 70, 72 have a first common diameter, or pitch. Likewise, end pulleys for the first and second bottom pair of belts 74, 76 have a second common diameter, or pitch that is less than the first. Thus, clockwise rotation of the left axle 96a causes the top left blade 52a to translate from an open position to a closed position across the frame aperture 56 at a first velocity. At the same time, rotation of the left axle 96a causes the bottom left blade 52b to translate across the frame aperture at a second, lower velocity. The result is that the overlapping blades 52a, 52b extend outward to the right, with the top blade 52a controlling the exposure.

In some embodiments, the shutter system 50 includes a first pair of linear supports 58a, 58b and a second pair of linear supports 60a, 60b. Each of the top blades 52a, 54a includes a respective pair of bearings 64 that engage the first pair of linear supports 60a, 60b. Similarly, each of the bottom blades 52b, 54b includes a respective pair of bearings that engage the second pair of linear supports 58a, 58b. The linear supports can be rails or tracks. In some embodiments, the linear bearings include ball bearings to further reduce friction.

The illustrated shutter system 50 includes a control module 102, a left rotary position sensor 100a sensing angular position of the left axle 96a, and a right rotary position sensor 100b sensing angular position of the right axle 96b. The control module 102 is in communication with each of the rotary position sensors 100a, 100b (generally 100) and motors 98a, 98b (generally 98). The control module 102 receives signals indicative of the angular positions of each of the axles 96a, 96b. The module 102 can be programmed to relate the angular position of the axle 96a, 96b to a position of each of the blades 52a, 52b, 54a, 54b. The module 102 can send signals to each of the motors 98a, 98b to control the respective angular velocity of each. In some embodiments, the sensors 100, control module 102, and motors 98 can be configured in a servo-control loop.

The cross section of the belt can have various shapes, such as flat, V-shaped, circular, or elliptical. The belts can be made of rubber, fiber, leather, polymers, metals and combinations thereof. In some embodiments, the belt is formed as a chain. Preferably the belts are durable yet lightweight to reduce inertia and facilitate rapid accelerations and decelerations during an exposure cycle.

Figure 7:
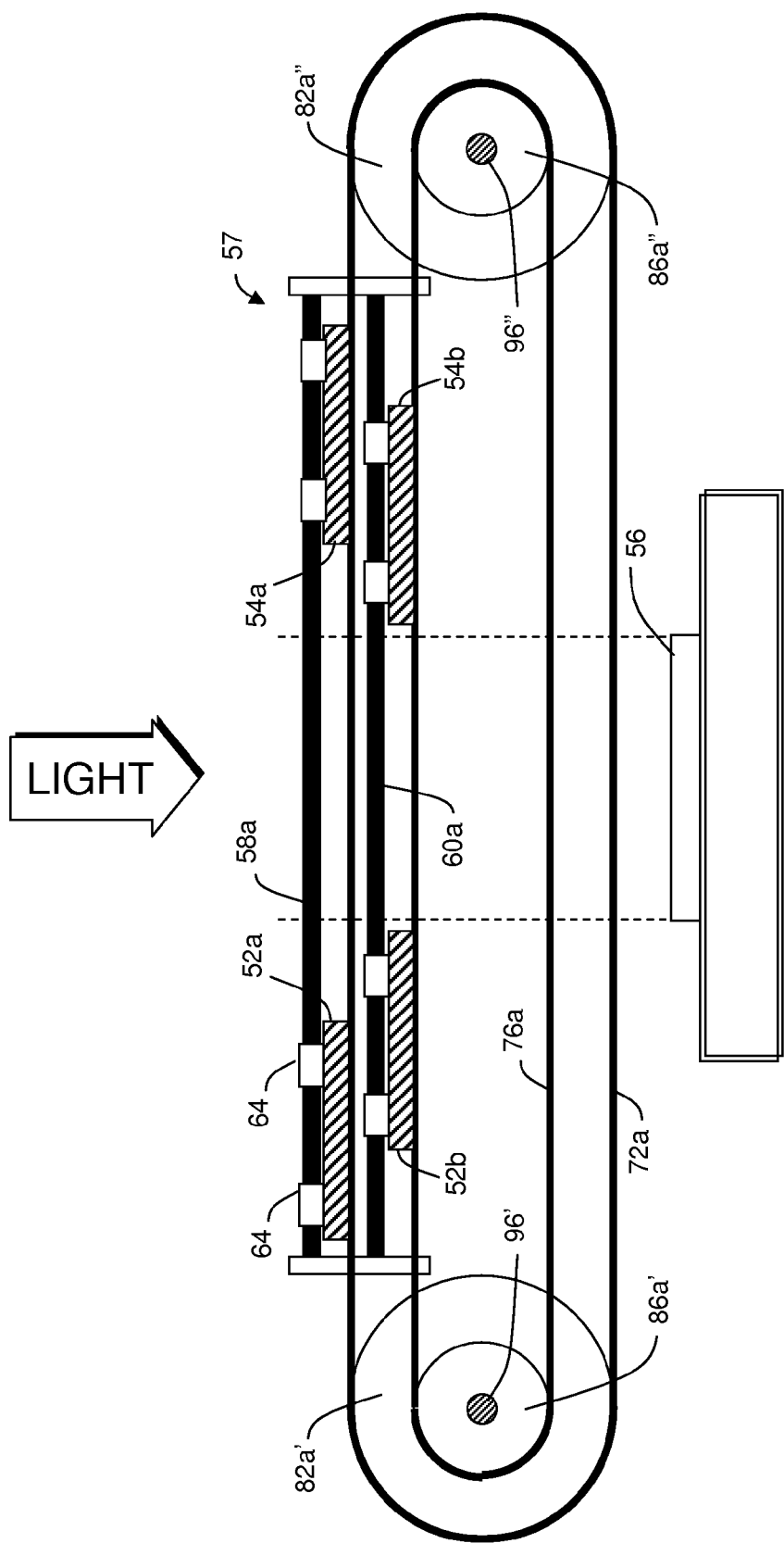
FIG. 7 shows a cross-sectional view of the dual-screen focal plane shutter of FIG. 6 taken along the line A-A.

FIG. 7 depicts a cross-sectional diagram of the dual-screen focal plane shutter of FIG. 6 taken along the line A-A. In the illustrative embodiment, the left and right top blades 52a, 54a reside in a common top plane. Similarly, the left and right bottom blades 52b, 54b reside in a common bottom plane. Each of the top and bottom planes is disposed above and parallel to the frame aperture 56. The top blades 52a, 54a are in communication with respective top belts 70a, 72a. Only one of the top belts 72a is visible as the other belt 70a is aligned with and behind it.

The bottom blades 52b, 54b are in communication with respective bottom belts 74a, 74b. Only one of the bottom belts 76a is visible as the other belt 74a is aligned with and behind it. The visible top belt 70a is disposed about an outer portion of the perimeter of the large pulleys 82a", 82a'. The visible bottom belt 72a is similarly disposed about an outer portion of the perimeter of the small pulleys 86a", 86a'. Each of the large and small pulleys 82a', 86a' disposed on left side of the frame aperture 56 rotate about the same central axle 96'. Similarly, each of the large and small pulleys 82a", 86a" disposed on right side of the frame aperture 56 rotate about the same central axle 96" parallel to the left central axle 96'. The difference in height between the top blades 52a, 54a and the bottom blades 52b, 54b is due to the difference in pitch between the large pulleys 82a", 82a' and the small pulleys 86a", 86a'.

Figure 8A:
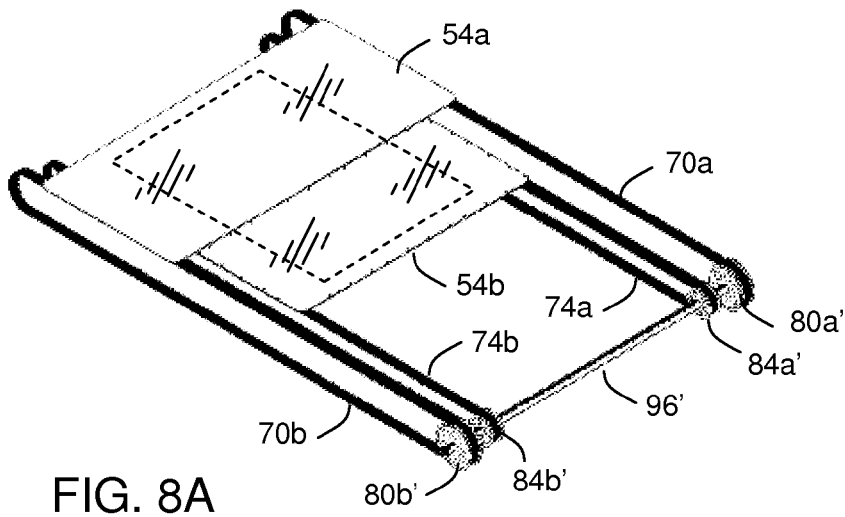
FIG. 8A through FIG. 8C each depicts a perspective view of one of the screens of the dual-screen focal plane shutter of FIG. 6, respectively illustrating the positions of the different blades during different instances of an exposure cycle.
Figure 8B:
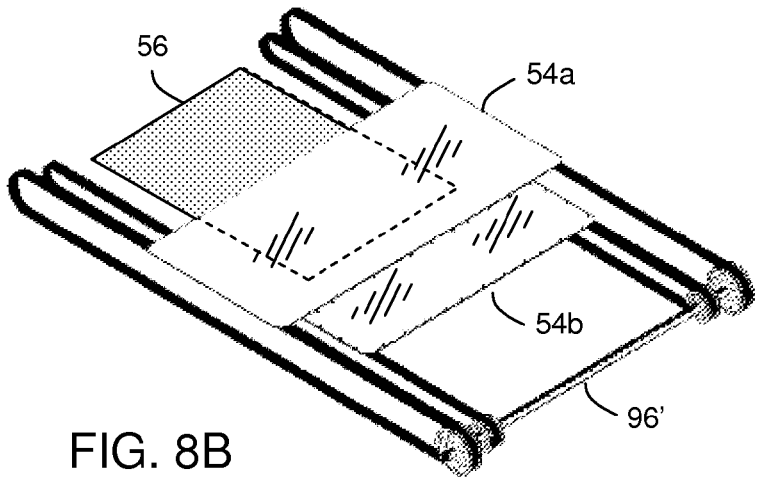
Figure 8C:
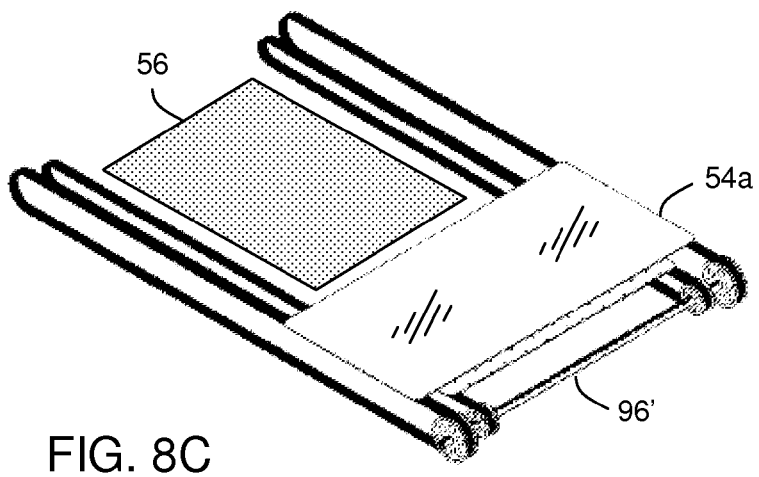

FIG. 8A through FIG. 8C depict perspective views of the left blades 52a, 52b of the belt and pulley drive mechanism of the focal plane shutter 50 shown in FIG. 6, illustrating the positions of the blades 52a, 52b during different times in an exposure cycle. FIG. 8A depicts the left blades 52a, 52b in a closed position covering the frame aperture 56. FIG. 8B depicts the left blades 52a, 53b in a partially closed position in which they cover a portion of the frame aperture 56, leaving an uncovered portion thereof exposed to light impinging from the other side of the blades 52a, 52b. FIG. 8C depicts the left blades 52a, 52b in a fully opened position in which they do not cover any portion of the frame aperture 56.

In the illustrated embodiments described above, the top blades, i.e., the blades most distant to the frame aperture 56 are the leading segment and move at the greatest velocity. It should be recognized that other configurations are contemplated according to the invention. For example, the blades moving with the greatest velocity can be the bottom blades, i.e., the blades closest to the frame aperture 56.

Figure 9:
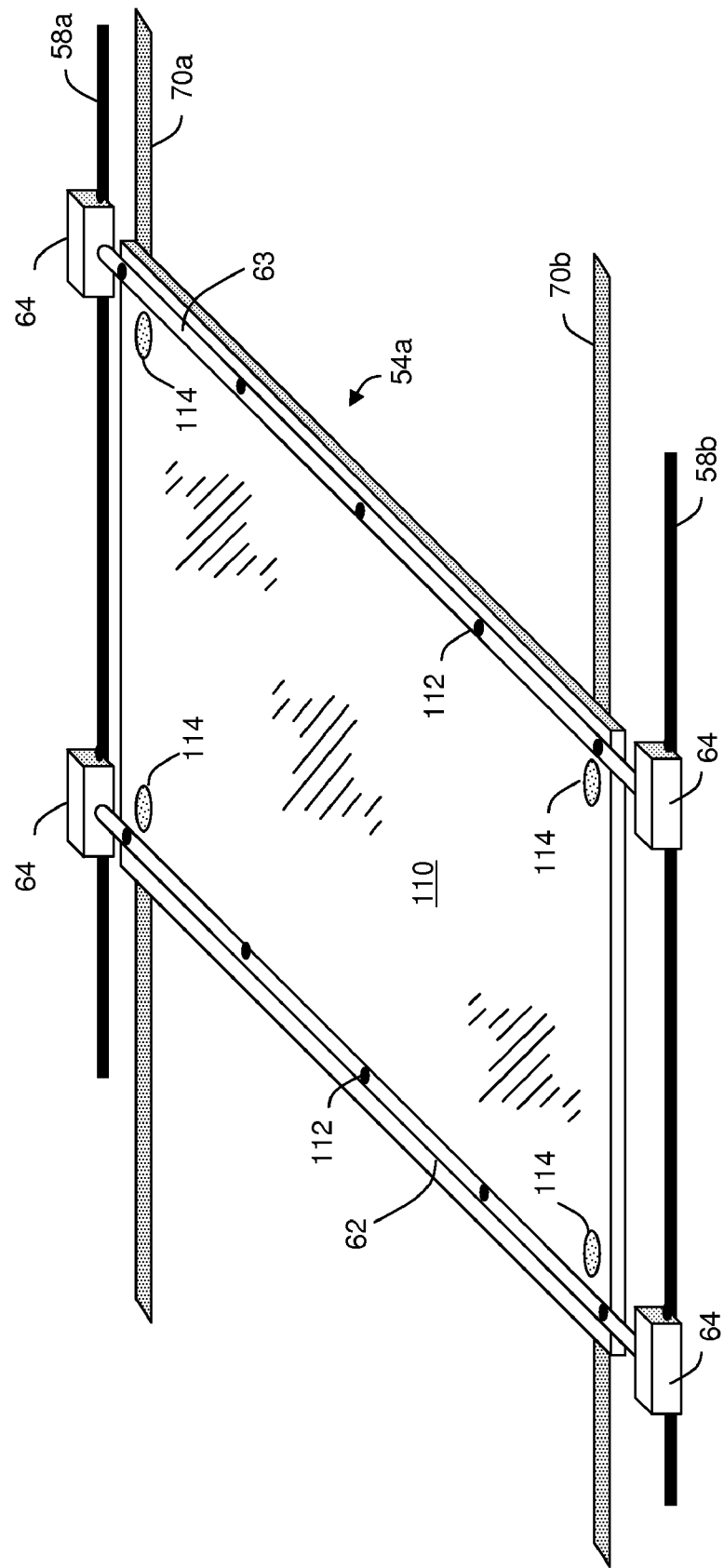
FIG. 9 depicts a perspective view of an exemplary one of the blades of FIG. 6.

FIG. 9 depicts a perspective block diagram of an exemplary embodiment of one of the blades 54a of FIG. 6. The blade 54a includes a planar member 110 coupled to first and second elongated frame members 62, 63. Each frame member 62, 63 is disposed along an edge of the planar member 110 perpendicular to the direction of motion, such that at least one of the elongated frame members 62, 63 adds rigidity along an exposure-controlling edge of the blade 54a. Thus sagging and substantial deformation of the edge is prevented. In other embodiments, the elongated frame members 62, 63 are oriented parallel to the direction of motion. In still other embodiments, no frame members 62, 63 are used, such as for materials that are sufficiently stiff to avoid sagging and deformation.

The elongated frame members 62, 63 are securely fastened to the planar member 110. For example, the elongated frame members 62, 63 can be securely fastened using mechanical fasteners 112, such as staples, screws, or stitching. Alternatively, or in addition, the elongated frame members 62, 63 can be securely fastened to the planar member 110 using a chemical fastener, such as glue or a thermal bonding component. Likewise, in some embodiments, the planar member 110 is coupled to the top and bottom belts 70a, 70b using mechanical fasteners 114, such as staples, screws, or stitching. Alternatively or in addition, the planar member 110 can be securely fastened to the he top and bottom belts 70a, 70b using a chemical fastener, such as glue or a thermal bonding component. Alternatively or in addition, the elongated frame members 62, 63 are similarly coupled to the top and bottom belts 70a, 70b.

Preferably, the blade 54a is lightweight yet substantially rigid to allow for rapid acceleration from a rest position to a maximum velocity. Being rigid, the blade 54a is less susceptible to distortion lending to a uniform, controlled exposure of the frame aperture 56 (FIG. 6). In some embodiments, the planar member 110 is formed from a carbon fiber sheet. The elongated frame members 62, 63 can be fabricated using a lightweight metal, such as aluminum or magnesium alloys, a polymer, or a combination of one or more different materials, such as a polymer-coated metal.

Each end of the elongated frame members 62, 63 includes a bearing 64 that slideably engages a rail. Preferably, the bearing 64 is mounted close to the planer member 110. Minimizing or eliminating extension of the ends of the elongated frame member 62, 63 beyond the end of the planar member 110 reduces the moment of force formed between the planar member 110 and the bearing 64 and improves control of the position of the screen 53a during an exposure cycle. The bearing 64 can include, for example, a slide bearing or a roller bearing.

While the invention has been shown and described with reference to specific embodiments, it should be understood by those skilled in the art that various changes in form and detail may be made therein without departing from the spirit and scope of the invention.

What is claimed is:

1. A focal plane shutter system, comprising:
  a multi-segmented screen having a plurality of overlapping blades each linearly moveable between open and closed positions to expose an aperture in the open position and to block the aperture in the closed position;
  a drive mechanism; and
  a plurality of belt-and pulley systems coupled to the drive mechanism, each belt-and-pulley system being coupled to a respective one of the overlapping blades and configured for linearly moving the respective overlapping blade at a velocity different from a velocity of the other overlapping blades.

2. The shutter system of claim 1, wherein each blade of the plurality of overlapping blades is substantially planar.

3. The shutter system of claim 1, wherein the drive mechanism comprises a rotary actuator.

4. The shutter system of claim 1, further comprising a controller in electrical communication with the drive mechanism to control movement of the multi-segmented screen between the open and closed positions.

5. The shutter system of claim 1, further comprising a position sensor providing an output signal indicative of a position of the multi-segmented screen.

6. The shutter system of claim 1, wherein each blade of the plurality of overlapping blades is rigid.

7. The shutter system of claim 1, wherein at least one blade of the plurality of overlapping blades comprises a carbon fiber panel.

8. The apparatus of claim 1, further comprising a servo-controller in electrical communication with the drive mechanism to control operation thereof in response a position of the multi-segmented screen.

9. The shutter system of claim 1, further comprising a second multi-segmented screen having a plurality of overlapping blades each linearly moveable between open and closed positions to expose an aperture in the open position and to block the aperture in the closed position, wherein the drive mechanism is coupled to the second multi-segmented screen through the plurality of belt-and-pulley systems, each belt-and-pulley system being coupled to a respective one of the overlapping blades of the second multi-segmented screen and configured for linearly moving the respective overlapping blade of the second multi-segmented screen at a velocity that is different from a velocity of the other overlapping blades of the second multi-segmented screen.

10. The focal plane shutter system of claim 1 wherein the drive mechanism comprises a linear actuator.

11. The focal plane shutter system of claim 1 wherein each of the belt-and-pulley systems comprises a pair of drive pulleys and a pair of belts.

12. The focal plane shutter system of claim 11 wherein the drive pulleys for each of the belt-and-pulley systems have a diameter that is different than the drive pulleys of the other belt-and-pulley systems.

* * * * *